(12) United States Patent
Chen et al.

(10) Patent No.: US 12,134,050 B2
(45) Date of Patent: Nov. 5, 2024

(54) EXTRACTION CELL CAP ASSEMBLY WITH TOOLLESS DISASSEMBLY

(71) Applicant: DIONEX CORPORATION, Sunnyvale, CA (US)

(72) Inventors: Weichiat Chen, Pleasanton, CA (US); Kannan Srinivasan, Tracy, CA (US)

(73) Assignee: Dionex Corporation, Sunnyvale, CA (US)

( * ) Notice: Subject to any disclaimer, the term of this patent is extended or adjusted under 35 U.S.C. 154(b) by 0 days.

(21) Appl. No.: 18/314,929

(22) Filed: May 10, 2023

(65) Prior Publication Data

US 2023/0271117 A1 Aug. 31, 2023

Related U.S. Application Data

(62) Division of application No. 17/038,672, filed on Sep. 30, 2020, now Pat. No. 11,684,877.

(51) Int. Cl.
*B01D 29/96* (2006.01)
*B01D 46/24* (2006.01)

(52) U.S. Cl.
CPC ......... *B01D 29/96* (2013.01); *B01D 46/2414* (2013.01); *B01D 2201/0415* (2013.01);
(Continued)

(58) Field of Classification Search
CPC ................ B01D 29/96; B01D 46/2414; B01D 2201/0415; B01D 2201/291;
(Continued)

(56) References Cited

U.S. PATENT DOCUMENTS 4,554,132 A 11/1985 Collins
5,147,551 A 9/1992 Averette
(Continued)

FOREIGN PATENT DOCUMENTS

CN 210473111 U 5/2020
DE 3605384 A1 8/1987
(Continued)

OTHER PUBLICATIONS

Campbell, M. et al., "High-pressure Microwave Digestion for the Determination of Arsenic, Antimony, Selenium and Mercury of Oily Wastes", Analyst, vol. 117: 121-124 (1992).
(Continued)

*Primary Examiner* — Madeline Gonzalez (57) ABSTRACT

An extraction cell cap assembly allows for toolless disassembly. The assembly includes a cap body having a threaded base releasably engaged with a cell vessel, a support member extending axially upward from the base, and a bore axially extending through the support member. The assembly also includes a locking cap having a plunger slidably received within the bore, a recess disposed within the plunger, and a locking portion that releasably engages the support member. Rotation of the locking cap in a first direction engages the locking portion with the support member, and rotation in an opposite direction disengages the locking portion. A filter is received in the recess and a seal member received in the bore, wherein the seal member forms a fluid-tight seal between the cell vessel and the assembly when the locking portion and the support member are engaged and the assembly is secured to the cell vessel.

5 Claims, 5 Drawing Sheets

(52) U.S. Cl.
CPC .... *B01D 2201/291* (2013.01); *B01D 2201/34* (2013.01); *B01D 2271/027* (2013.01)

(58) Field of Classification Search
CPC .......... B01D 2201/34; B01D 2271/027; B01D 11/02; B01L 2200/0689; B01L 2300/046; B01L 2300/0681; B01L 2400/0478; B01L 3/50825; F16J 13/12
USPC .... 210/232, 439, 455, 493.2, 450, 446, 634, 210/198.2, 464, 466, 470
See application file for complete search history.

(56) References Cited

U.S. PATENT DOCUMENTS

| | | | |
|---|---|---|---|
| 5,193,703 | A | 3/1993 | Staats, III et al. |
| 5,198,197 | A | 3/1993 | Clay et al. |
| 5,268,103 | A | 12/1993 | Jameson et al. |
| 5,647,976 | A | 7/1997 | Rothe et al. |
| 5,660,727 | A | 8/1997 | Gleave et al. |
| 5,785,856 | A | 7/1998 | Gleave et al. |
| 5,843,311 | A | 12/1998 | Richter et al. |
| 5,863,260 | A | 1/1999 | Butler, Jr. et al. |
| 5,879,634 | A | 3/1999 | Ford |
| 6,803,237 | B2 | 10/2004 | Manganini et al. |
| 7,866,499 | B2 | 1/2011 | Cacace |
| 9,375,697 | B2 | 6/2016 | Mcadams et al. |
| 2003/0175166 | A1 | 9/2003 | Schluter |
| 2007/0125947 | A1 | 6/2007 | Sprinzak et al. |
| 2008/0003638 | A1 | 1/2008 | Goldman et al. |
| 2008/0110814 | A1 | 5/2008 | Izzo et al. |
| 2008/0314252 | A1* | 12/2008 | Min ................... F25B 39/04 96/151 |
| 2010/0202929 | A1 | 8/2010 | Renslow |
| 2015/0258521 | A1* | 9/2015 | McAdams ............. B23P 6/00 29/402.08 |

FOREIGN PATENT DOCUMENTS

| | | |
|---|---|---|
| EP | 0248379 A2 | 12/1987 |
| EP | 0485668 A1 | 5/1992 |
| EP | 2918323 A1 | 9/2015 |

OTHER PUBLICATIONS

Capriel, P., et al., "Supercritical Methanol: An Efficacious Technique for the Extraction of Bound Pesticide Residues from Soil and Plant Samples", J. Agric. Food Chem., vol. 34: 70-73 (1986).

Dionex, AS Autosampler Operator's Manual, Doc. No. 065051, Rev. 03, Jan. 2008, 356 pages.

EP Extended Search Report dated Feb. 21, 2022, to EP Patent Application No. 21199693.

Fernando, L. et al., "Closed-Vessel Microwave dissolution and Comprehensive Analysis of Steel by Direct Current Plasma Atomic Emission Spectrometry", Anal. Chem., vol. 58:511-512 (1986).

Fischer, L. et al., "Microwave Dissolution of Geologic Material: Application to Isotape Dilution Analysis", Anal. Chem., vol. 58: 261-263 (1986).

Freitag, W. et al., "Fast Separation of Stabilizers from Plyolefins by Microwave Heating", Die Angewandte Makromolekulare Chemie, 175: 181-185 (1990).

Ganzler, K. et al., "A New Method for the Extraction and High-performance Liquid Chromatographic Determination of Vicine and Convicine in Fababeans", Chromatography, pp. 435-443 (1984).

Ganzler, K. et al., "Effective sample preparation method for extracting biologically active compounds from different matrices by a microwave technique", Journal of Chromatography, vol. 520: 257-262 (1990).

Ganzler, K. et al., "Microwave Extraction A Novel Sample Preparation Method for Chromatography" Journal of Chromatography, vol. 371 : 299-306 (1986).

Hocquellet, P. et al., "Evaluation of Microwave Digestion and Solvent Extraction for the Determination of Trace Amounts of Selenium in Fees and Plant Animal Tissues by Electrothermal Atomic Absorption Spectrometry" Analyst, vol. 116: 505-509 (1991).

Kingston, H.M. et al., "Microwave Energy for Acid Decomposition at Elevated Temperatures and Pressures using Biological and Botanical Samples", Anal. Chem., vol. 58: 2534-2541 (1986).

Mahan, K. et al., "Microwave Digestion Techniques in the Sequential Extraction of Calcium, Iron, Chromium, Manganese, Lead, and Zinc in Sediments", Anal. Chem., vol. 59: 938-945 (1987).

Nielson, R. et al., "Extraction and Quantitation of Polyolefin Additives", Journal of Liquid Chromatography, vol. 41(3): 503-519 (1991).

Nieuwenhuize, J. et al., "Comparison of Microwave and Conventional Extraction Techniques for the Determination of Metals in Soil, Sediment and Sludge Samples by Atomic Spectrometry", Analyst, vol. 116: 347-351 (1991).

Rezaaiyan R. et al., "A Comparison of Mineral Extraction Techniques of Citrus Juices as Analyzed by Inductively Coupled Plasma Atomic Emission Spectrometry", Journal of Food Science, vol. 55(5): 1359-1360 (1990).

Schnitzer, et al., "Organic Matter Extraction form Soils with Water at High Pressure and Temperatures", Soil Sci. Soc. Am J., vol. 55: 102-108 (1991).

Schnitzer, et al., "Supercritical Gas Extraction of Alkanes and Alkanoic Acids", Soil Sci. Soc. Am., vol. 30: 913-919 (1986).

Schnitzer, M. et al., "Supercritical Gas Extraction of a Soil with Solvents of Increasing Polarities.sup.1", Soil Sci. Soc. Am J., vol. 51: 639-646(1987).

* cited by examiner

EXTRACTION CELL CAP ASSEMBLY WITH TOOLLESS DISASSEMBLY

CROSS REFERENCE TO RELATED APPLICATION

This application is a Divisional of U.S. patent application Ser. No. 17/038,672, titled which was filed on Sep. 30, 2020, the disclosure of which is hereby incorporated herein by reference in its entirety.

BACKGROUND OF INVENTION

Field of Invention

This application relates, in general, to an extraction cell cap assembly with toolless disassembly, and more particularly to a cap assembly for use with Accelerated Solvent Extraction (ASE) cells that allows full disassembly without the use of tools.

Description of Related Art

Sample preparation constitutes an important step in the analysis of organic compounds. Extraction is an integral part of sample preparation. Accelerated Solvent Extraction (ASE) is a technique used for extracting the analytes of interest using a solvent at elevated temperatures and pressures. The elevated pressure elevates the boiling point of the solvent thereby allowing faster extraction to be conducted at relatively high temperatures. Thus, the extraction process is significantly faster than traditional methods such as Soxhlet extraction. A cell to hold the sample as well as a filter (or frit) are integral components of an ASE instrument.

ASE extractions can occur at relatively high pressures (e.g., 1500 psi), and operating at such high pressures requires careful design of the extraction cell. An extraction cell generally includes a conduit or main cell vessel that has end caps sealing the cell vessel. The role of the end cap is to seal the cell vessel and to facilitate easy access into the cell. The end cap also includes a seal and a bed support or frit that retains solid components within the cell. More facile replacement of these parts would add to ease of use from a user perspective.

An exemplar of an extraction cell is described in U.S. Pat. No. 9,375,697 to McAdams et al., which cell is well suited for high pressure and temperature ASE, and which includes a cap assembly that facilitates removal and replacement of certain components of the cap assembly. Such assemblies allow users to conveniently clean the extraction cell prior to their next extraction to prevent carry over. For trace analysis, users will often replace certain components of the cap assembly, such as the seal and the bed support to prevent carry-over contamination.

In order to partially or fully disassemble existing extraction cell assemblies, users generally need to use a snap ring tool to remove a retaining ring. One will appreciate that the appropriate snap ring tool must be readily available, and that use of the snap ring tool requires a degree of skill and manual dexterity to remove and properly install and remove the retainer ring, particularly so after repeated extractions. Users need to exercise care when removing the retainer ring to prevent pinching and to prevent an energized retainer ring from flying off from the snap ring tool.

In light of the foregoing, it would be beneficial for an extraction cell end cap design that further facilitates easy removal and replacement of the end cap components.

BRIEF SUMMARY

One aspect of the present invention is directed to an extraction cell including: a cell vessel; a cap assembly removably secured to the cell vessel to define a sample chamber within the cell vessel, the cap assembly including a cap body and a locking cap; the cap body including a threaded base releasably engaged with the cell vessel, a support member extending axially upward from the threaded base, and a bore axially extending through the support member; the locking cap including a plunger slidably received within the bore of the cap body, a recess disposed within a lower surface of the plunger, and a locking portion that releasably engages the support member of the cap body, wherein rotation of the locking cap in a first direction relative to the cap body engages the locking portion with the support member, and rotation in an opposite second direction disengages the locking portion from the support member; a filter removably received within the recess; and a seal member removably received within the bore, wherein the seal member forms a fluid-tight seal between the cell vessel and the cap assembly when the locking portion and the support member are engaged and the cap assembly is secured to the cell vessel.

The cap body may be threadably engaged with the cell vessel.

The plunger and locking portion of the locking cap are monolithically formed.

The locking portion may include a locking flange and the support member may include a support flange, wherein the locking and support flanges axially overlap with one another when the locking cap is rotated in the first direction relative to the cap body.

The locking flange extends radially inward from a peripheral wall of the locking cap, and the support flange extends radially outward from an annular surface of the support member.

The locking portion may include three circumferentially spaced locking flanges and the support member may include three circumferentially spaced support flanges, wherein respective pairs of locking and support flanges axially overlap with one another when the locking cap is rotated in the first direction relative to the cap body.

The cap assembly may include a locked mode and an unlocked mode, and wherein the locking flange is in an axially overlapping alignment with the support flange when in the locked mode to secure the locking cap and cap body together, and the locking and support flanges do not axially overlap in the unlocked mode to allow removal of the locking cap from the cap body.

The cap assembly may be configured to release the filter from the cap assembly when the cap assembly is removed from the cell vessel, in the unlocked mode, and the locking cap is pressed against the cap body to axially move the plunger into the bore of the cap body and then move the seal member out of frictional engagement with the bore.

The filter may be a frit that provides a bed support to support holding a sample contained within the sample chamber.

The seal member may be formed of a polyether ether ketone (PEEK) or a polyimide-based plastic material.

The seal member may include an upper surface abutting against the plunger around the recess, and a lower surface abutting against the cell vessel.

The seal member may further include a radially peripheral outer surface frictionally engaging the bore of the cap body to releasably secure the filter within the recess of the plunger when the cap assembly is assembled.

The cap assembly may be configured to release the filter from cap assembly when the cap assembly is removed from the cell vessel and the locking cap is pressed against the cap body to axially move the plunger into the bore of the cap body and then move the seal member out of frictional engagement with the bore.

The cap body may be formed of a first stainless steel and the locking cap may be formed of a second stainless steel, wherein the first and second stainless steels are different materials.

The first stainless steel may be an austenitic stainless steel that has a higher percentage of both silicon and manganese than the second stainless steel.

Another aspect of the present invention is directed to a method of using an extraction cell cap assembly including: inserting a plunger of a locking cap into a bore of a cap body; rotating the locking cap in a first direction relative to the cap body to releasably engage a locking portion of the locking cap with a support member of the cap body; inserting a filter into a recess disposed in a lower surface of the plunger; inserting a seal member into the bore of the cap body against the filter in the recess, whereby frictional engagement of the seal member to the bore of the cap body serves to hold the filter in the recess of the locking member.

The cap body may be threadably engaged with a cell vessel to define a sample chamber within the cell vessel.

The locking portion may include a locking flange and the support member may include a support flange, and wherein the rotating step may include axially overlapping the locking and support flanges with one another when the locking cap is rotated in the first direction relative to the cap body.

The locking portion may include a locking flange and the support member may include a support flange, and wherein the rotating in the first direction establishes a locked mode in which the locking flange is in an axially overlapping alignment with the support flange to secure the locking cap and cap body together.

The method may further include rotating the locking cap in a second direction relative to the cap body to establish an unlocked mode in which the locking and support flanges do not axially overlap thus allowing removal of the locking cap from the cap body.

The method may further include, when the cap body is not secured to a cell vessel, pressing the locking cap against the cap body to move the plunger into the bore of the cap body and press the seal member out of frictional engagement with the bore to release the filter from the cap from the locking cap.

Yet another aspect of the present invention is directed to a cap assembly for an extraction cell including: a cap body including a threaded base adapted to releasably engage the end of a cell vessel, a support member extending axially upward from the threaded base, and a bore axially extending through the support member; a locking cap including a plunger slidably received within the bore of the cap body, a recess disposed within the plunger, and a locking portion that releasably engages the support member of the cap body, wherein rotation of the locking cap in a first direction relative to the cap body engages the locking portion with the support member, and rotation in an opposite second direction disengages the locking portion from the support member; a filter removably received within the recess; and a seal member removably received within the bore, wherein the seal member is adapted to form a fluid-tight seal between the cell vessel and the cap assembly when the cap assembly is secured to the cell vessel.

The locking portion may include a locking flange and the support member may include a support flange, wherein the locking and support flanges axially overlap with one another when the locking cap is rotated in the first direction relative to the cap body.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention(s) as defined by the appended claims.

Extraction cell assemblies generally function as sample-carrying containers that may be used in conjunction with various fluidic devices such as accelerated solvent extraction (ASE) instruments for extracting analytes of interest from a sample. During ASE extractions, a sample inside an extraction cell is heated to elevated temperatures and pressures with solvents to accelerate extractions of analytes. The elevated pressure for extraction can be a value that is greater than ambient pressure, more specifically may range from about 50 pounds per square inch to about 3000 pounds per square inch, and preferably may range from about 50 pounds per square inch to about 2000 pounds per square inch. The elevated temperature for extraction can be a value that is greater than ambient, and more specifically may range from about 30° C. to about 300° C.

In accordance with various aspects of the present invention, extraction cell assemblies may be configured with end caps or cell cap assemblies that allow easy removal and replacement of seals and bed supports, and which end cap assemblies are configured to allow a user to disassemble the cell cap assemblies without tools.

Figure 1:
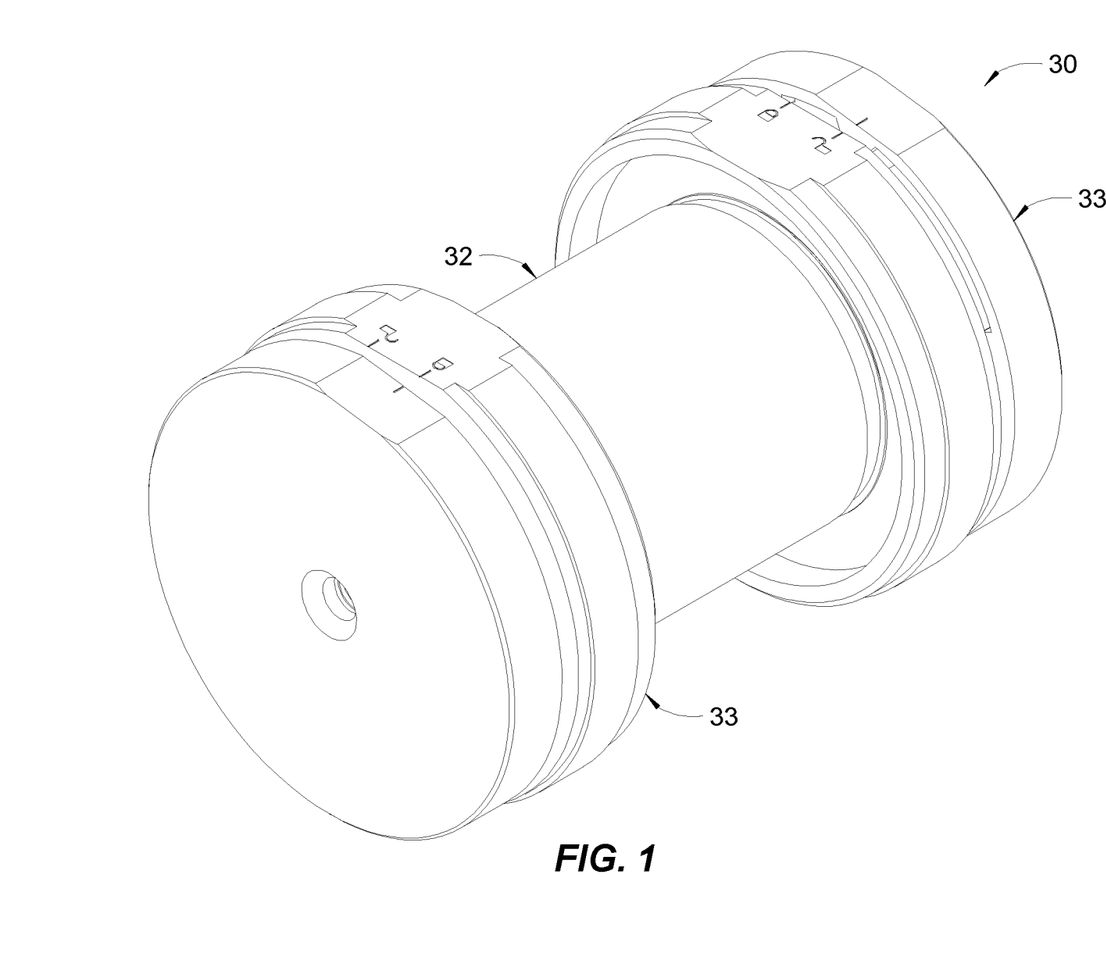
FIG. 1 is a perspective view of an exemplary extraction cell in accordance with various aspects of the present invention.

Turning now to the drawings, wherein like components are designated by like reference numerals throughout the various figures, attention is directed to FIG. 1, which shows an exemplary extraction cell generally designated 30. The extraction cell includes a tubular cell vessel 32 adapted to receive a sample for extraction, and two cap assemblies 33 removably secured to opposing ends of the cell vessel. The cell cap assemblies fluidly seal the cell vessel to provide a sample chamber within the cell vessel that is suitable for use with extractions at elevated temperatures and pressures. One will appreciate that the two cap assemblies may, but need not, be of identical design.

Figure 2:
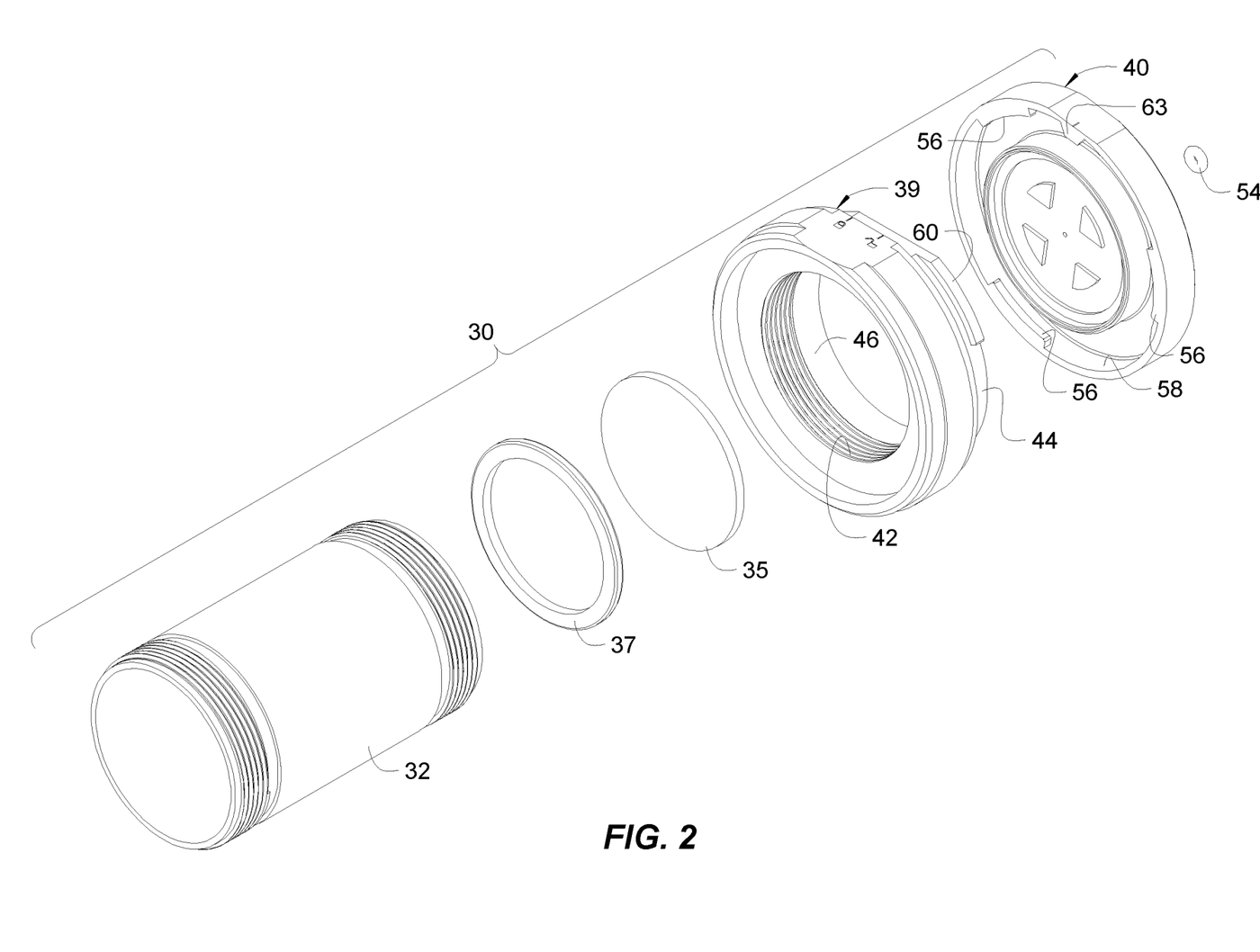
FIG. 2 is an exploded perspective view of various components of the extraction cell of FIG. 1.

With reference to FIG. 2, each extraction cell cap assembly also includes a filter 35 and a seal member 37. The filter may be in the form of a frit that provides a bed support for the sample and filters fluid flow to and from the sample chamber. The frit may be formed of porous stainless steel, however, one will appreciate that other suitable filter elements and/or materials may be utilized in accordance with various aspects of the present invention. Respective seal members fluidly seal cell vessel 32 to each of the cell cap assemblies 33 to provide a high-pressure fluid-tight sample chamber. In addition, and as discussed below, the seal member may be provided with a frictional interference fit to capture it and the filter inside the cap assembly to prevent accidental removal of seal or filter when a user is loading and unloading sample to and from the sample chamber.

The cap assembly is generally made of two discrete parts, a cap body 39 and a releasable locking cap 40. In various aspects, the cap assembly has similar sealing features as current designs such as the above mentioned U.S. Pat. No. 9,375,697, as well as U.S. Pat. No. 5,647,976 to Rothe et al., the entire content of which patents is incorporated herein for all purposes by this reference. Such sealing features ensure compatibility between the extraction cap assemblies described herein with existing cell bodies that are currently used on existing systems, including, but not limited to the Thermo Fisher Scientific® ASE® 150 and 350 Accelerated Solvent Extractors provided by Thermo Fisher Scientific of Sunnyvale, Calif.

A significant advantage of the extraction cell assemblies described herein is that it may be used in various existing devices, including but not limited to the Thermo Fisher Scientific® ASE® 150 and 350 Accelerated Solvent Extractors. Also, the cap assembly 33 is similarly compatible with current cell bodies.

In various configurations, the cap body and the locking cap may be metallic, and may be formed of stainless steel. One will appreciate, however, that other suitable materials may be used. To lessen the possibility of galling or seizing, the cap body and the locking cap may be formed of different materials. For example, the cap body may be formed of an austenitic stainless steel such as Nitronic® 60 (or other alloys containing silicon and manganese) and the locking cap may be formed of a 300 series stainless steel. Nitronic® 60 is an austenitic stainless steel that has a higher percentage of both silicon and manganese than 300 series stainless steel. Alternatively, or in addition to, the cap body and/or locking cap may be provided with an anti-gall coating or compound to lessen the possibility of galling or seizing. As an example, the cap body, locking cap, or cell vessel may include a zirconium metal, or a zirconium based metal alloy, so that the metal is more inert to acidic or basic reagents that may be present during extraction. Alternatively, the cap body, locking cap, or cell vessel may be coated with a zirconium metal or a zirconium-based metal alloy.

Figure 5A:
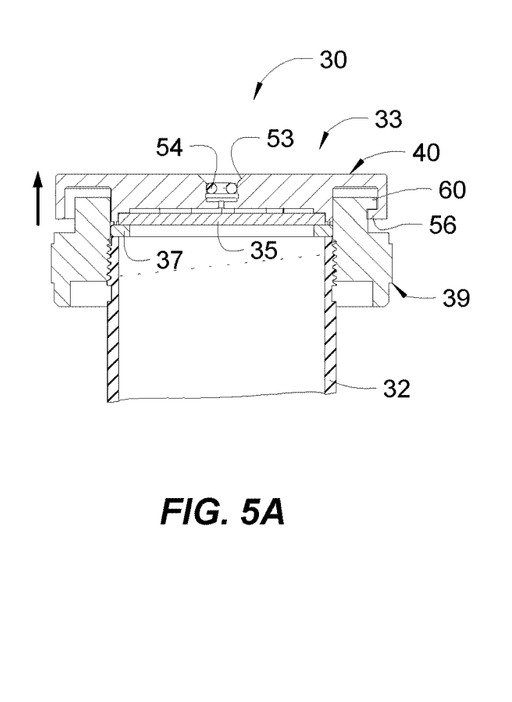
FIG. 5A, FIG. 5B and FIG. 5C are cross-sectional side views of cap assembly components of the extraction cell of FIG. 1, with FIG. 5A showing the cap assembly in an assembled state, FIG. 5B showing the locking cap and cap body in a compressed state facilitating disassembly, and FIG. 5C showing the components fully dissassemblied.
Figure 5B:
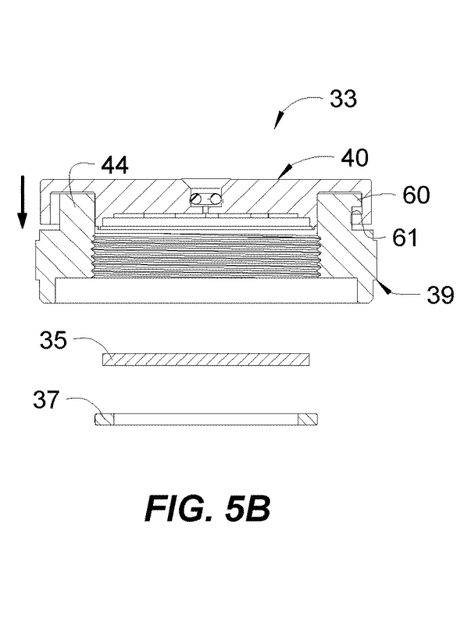
Figure 5C:
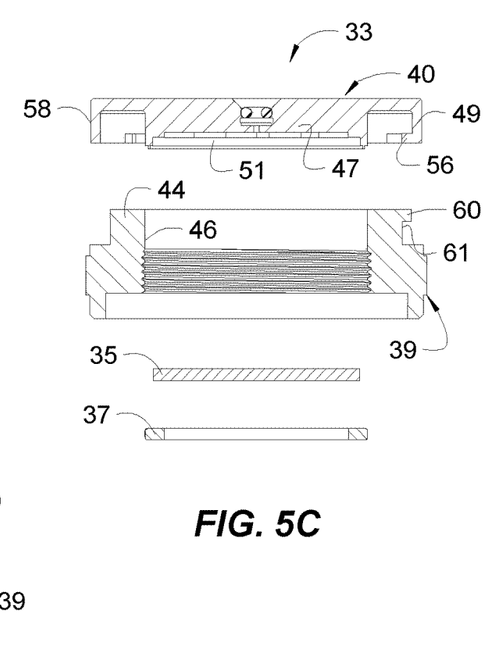

With reference to FIG. 5C, cap body 39 generally includes a threaded base 42, a support member 44 extending axially above the threaded base, and a precision through bore 46 axially extending through the support member toward the treaded base. The threaded base and support member may be monolithically formed as the cap body.

Locking cap 40 generally includes a plunger 47 that fits into bore 46 of cap body 39, and a locking portion 49 that selectively engages support member 44 of cap body 39 to selectively lock the locking cap to the cap body. The plunger and the locking portion may be monolithically formed.

The locking cap also includes a recess 51 that is dimensioned and configured to receive and locate frit 35 within the cap assembly (see FIG. 5A) such that fluid flowing through orifice 53 into cell vessel 32 must pass through bed support 35. The frit may also be referred to as a filter or a bed support. The bed support provides support for holding a sample that is in the form of a bed of material or particles within the extraction cell. One will appreciate that the orifice may be configured to sealingly receive a nozzle against O-ring 54 so that solvent can be dispensed into the assembled extraction cell and also form a gas-tight sample chamber while the extraction assembly is heated and pressurized.

Figure 4A:
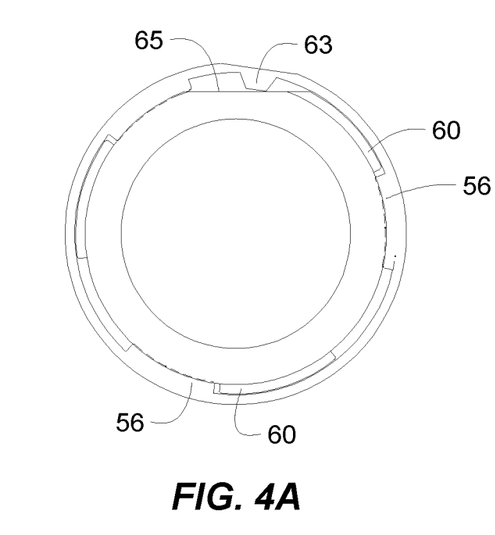
FIG. 4A and FIG. 4B are schematic views of the locking cap and cap body of FIG. 3A, with FIG. 4A showing the locking cap and cap body in alignment for the unlocked state, and FIG. 4B showing the locking cap and cap body in alignment for a locked state.
Figure 4B:
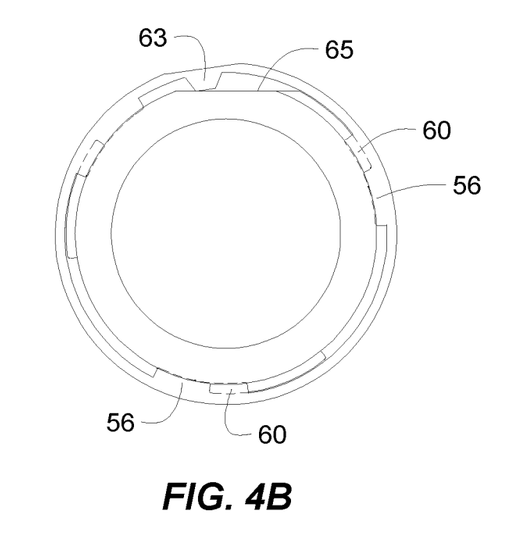

In various configurations, the locking portion may take the form of one or more locking flanges 56 extending inwardly from a peripheral wall 58 of locking cap 40, and the support member may include one or more support flanges 60 extending outwardly from an upper annular surface 61 of the cap body's support member 44. The locking flanges disengage from the support flanges when the locking cap is rotated in one direction relative to the cap body (see FIG. 4A), and they engage when the locking cap is rotate in the opposite direction relative to the cap body (see FIG. 4B). As shown, three circumferentially spaced locking flanges may be provided to cooperate with three circumferentially spaced support flanges. However, one will appreciate that a wide variety of configurations may be utilized. For example, the locking and support flanges may take the form of two, three, four or more cooperating pairs of locking and support flanges, inward facing support flange(s) and cooperating outward facing locking flange(s), cooperating internal and external threads, and the like.

Locking cap 40 and cap body 39 may be positioned in an "unlocked" alignment (see FIG. 3A and FIG. 4A) such that the locking flanges are not aligned with the support flanges. Such unlocked position allows locking cap 40 to be assembled with cap body 39 such that plunger 47 is inserted into bore 46 (see FIG. 5A), and then the locking cap can be turned clockwise relative to the cap body to a "locked" alignment (see FIG. 3B and FIG. 4B). In the locked alignment, locking flanges 56 overlap with support flanges 60 to prevent axial separation of locking cap 40 from cap body 39. And one will appreciate that the locking cap can be turned counterclockwise back to the "unlocked" position whereby there is no interference between the locking and support flanges whereby the cap assembly may be quickly and effortlessly disassembled without tools to facilitate cleaning and/or replacement of parts (see FIG. 5C).

The locking cap may be provided with an inward facing lobe 63 to limit the range of motion between locking cap 40 and cap body 39. For example, lobe 63 may be dimensioned and configured to prevent the locking cap turning beyond its "lock" position by abutting against a stop surface 65 on cap body 39 (see FIG. 3B and FIG. 4B). In various configurations, the stop surface may limit travel beyond both the "locked" and "unlocked" positions as the lobe abuts against the stop surface in either direction. One will appreciate that both the locking cap and the cap body may be provided with indicia showing the "unlocked" and "locked" alignments between the locking cap and cap body (see FIG. 3A and FIG. 3B, respectively). One will appreciate that such indicia may be formed with laser marking, etchings, and/or other suitable means.

Locking cap 40 can axially reciprocate within the bore of cap body 39—its outward movement (e.g., upward movement in FIG. 5A) limited by engagement between locking portion 49 of the locking cap and support member 44 of the cap body, and its inward movement (e.g., downward in FIG. 5B) limited by an upper surface of support member 44 abutting against an inner surface of the locking cap. This axial movement allows plunger 47 of the locking cap to properly seat against and clamp seal member 37 against cell vessel 32 as the cap assembly is rotatably mounted to the cell vessel for proper sealing during high-pressure extraction (see FIG. 5A). Seal member 37 may include an upper surface abutting against plunger 47, a lower surface abutting against the cell vessel, and an outer surface abutting against cap body 39 when the cap assembly tightened onto the cell vessel.

Seal member 37 may be in the shape of a ring having a radially peripheral outer surface and a radial inner surface. Plunger 47 can have a peripheral lip or protrusion configured to seat against and form a gas/liquid seal with the upper surface of seal member 37.

Such configuration also allows easy removal of seal member 37 and frit 35—a user may remove the cap assembly from the cell vessel, place the cap assembly on a flat surface such as a lab bench, and simply press locking cap 40 into cap body 39 to release the seal and frit from the cap body (see FIG. 5B). Such configuration also provides a second way to remove the seal and frit—a user may remove the cap assembly from the cell vessel, turn the locking cap counterclockwise to unlock and remove the locking cap from the cap body, and to access the frit and the seal. Both methods provide users with a quick and easy method of seal and frit replacement without the need for any tools.

Seal member 37 is designed to be a light press fit into bore 46 within cap body 39, that is, the seal is designed for a frictional interference fit with the bore. For example, a radially peripheral outer surface of the seal can from the frictional interference fit with the bore. Such a press fit keeps the seal member in place during installation of cap assembly 33 onto cell vessel 32, while allowing the seal member to be ejected with the plunger as described above. In various configurations, the seal member may be formed of a of polyether ether ketone (PEEK), a polyimide-based plastic material (e.g., Vespel® plastics), or other suitable materials that promote such frictional interference fits.

When the cap assembly and the seal member are used in extractions and other fluid analysis, they may be subjected to high pressures, high temperatures, and solvents. For example, in ASE extraction applications, the cap assembly and seal are preferably configured to withstand temperatures of approximately 25° C. to 300° C., more preferably approximately 100° C. to 250° C., and more preferably approximately 100° C. to 200° C.), and pressure ranges of approximately 10 psi to 10,000 psi, more preferably approximately 100 psi to 2000 psi, and most preferably approximately 100 psi.

In operation and use, extraction cell 30 and cap assembly 33 is configured such that no special tools are needed to fully assemble and disassemble the cap assembly. A user can readily install and remove the seal and/or bed support by hand with ease. To install seal member 37 and frit 35, a user only has to place the bed support in recess 51 of the locking cap, then install the seal with minimal effort with one's fingers or thumbs pushing the seal into bore 46 of the cap body. The interference fit between seal member 37 and cap body 39 keeps frit 35 in place in the locking cap, as shown in FIG. 5A. The user may then screw the cap assembly tightly onto cell vessel 32 to fully seat seal member 37 into place.

Locking cap 40 is generally in the locked position (FIG. 3A) when a user screws cap assembly 33 onto cell vessel 32. When in the locked position, seal member 37 is compressed against the cell vessel, locking cap and cap body as the cap assembly is threaded to the cell vessel. Such compression also serves to load locking flanges 56 against support flanges 60 and frictionally lock the two against one another thus preventing accidental turning of the locking cap to the unlocked position.

Figure 3A:
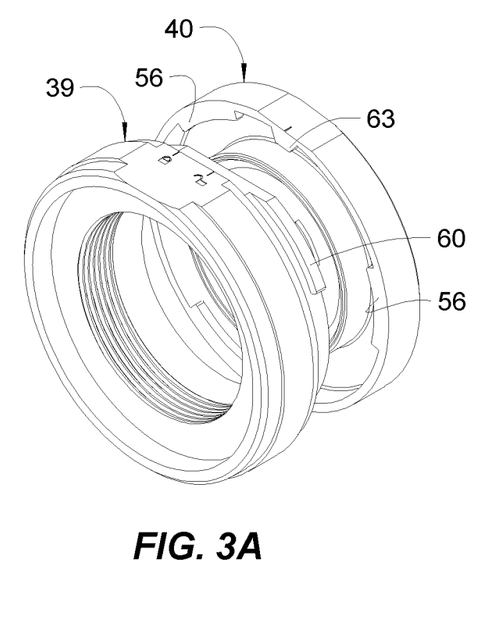
FIG. 3A and FIG. 3B are exploded views of cap assembly components of the extraction cell of FIG. 1, with FIG. 3A showing a cap body and locking cap in alignment for an unlocked state, and FIG. 3B showing the cap body and locking cap in alignment for a locked state.
Figure 3B:
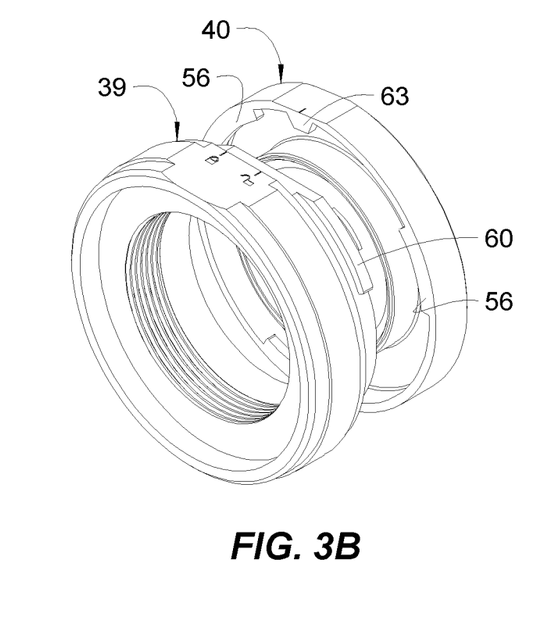

The cap assembly may be configured to "lock" with a slight clockwise turn of locking cap 40 relative to cap body 39 (e.g., from FIG. 3A to FIG. 3B). Such configuration also prevents the locking cap from moving to the unlock position while a user is securing the cap assembly to the cell vessel by threading cap assembly 33 clockwise onto cell vessel 32. When the locking cap is turned to the lock position, further rotational movement of the locking cap relative to the cap body is restricted as lobe 63 abuts against stop surface 65 on the cap body.

For convenience in explanation and accurate definition in the appended claims, relative terms such as "upper", "downward, and "lower" are merely used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of using an extraction cell cap assembly comprising:

inserting a plunger of a locking cap into a bore of a cap body;

rotating the locking cap in a first direction relative to the cap body to releasably engage a locking portion of the locking cap with a support member of the cap body;

inserting a filter into a recess disposed in a lower surface of the plunger;

inserting a seal member into the bore of the cap body against the filter in the recess, whereby frictional engagement of the seal member to the bore of the cap body serves to hold the filter in the recess of the locking cap;

threadably engaging the cap body with a cell vessel to define a sample chamber within the cell vessel; and heating a sample inside the sample chamber to an elevated temperature and pressure with solvent to accelerate extractions of analytes from the sample.

2. The method according to claim 1, wherein the locking portion includes a locking flange and the support member includes a support flange, and wherein the rotating step includes axially overlapping the locking and support flanges with one another when the locking cap is rotated in the first direction relative to the cap body.

3. The method according to claim 1, wherein the locking portion includes a locking flange and the support member includes a support flange, and wherein the rotating in the first direction establishes a locked mode in which the locking flange is in an axially overlapping alignment with the support flange to secure the locking cap and cap body together.

4. The method according to claim 3, further comprising rotating the locking cap in a second direction relative to the cap body to establish an unlocked mode in which the locking and support flanges do not axially overlap thus allowing removal of the locking cap from the cap body.

5. The method according to claim 1, further comprising, when the cap body is not secured to the cell vessel, pressing the locking cap against the cap body to move the plunger into the bore of the cap body and press the seal member out of frictional engagement with the bore to release the filter from the locking cap.

* * * * *